Aug. 22, 1933.  E. JOHNSON  1,924,041
PROCESS OF MANUFACTURING A PRODUCT CONTAINING
AMMONIUM NITRATE AND CALCIUM CARBONATE
Filed Feb. 27, 1930
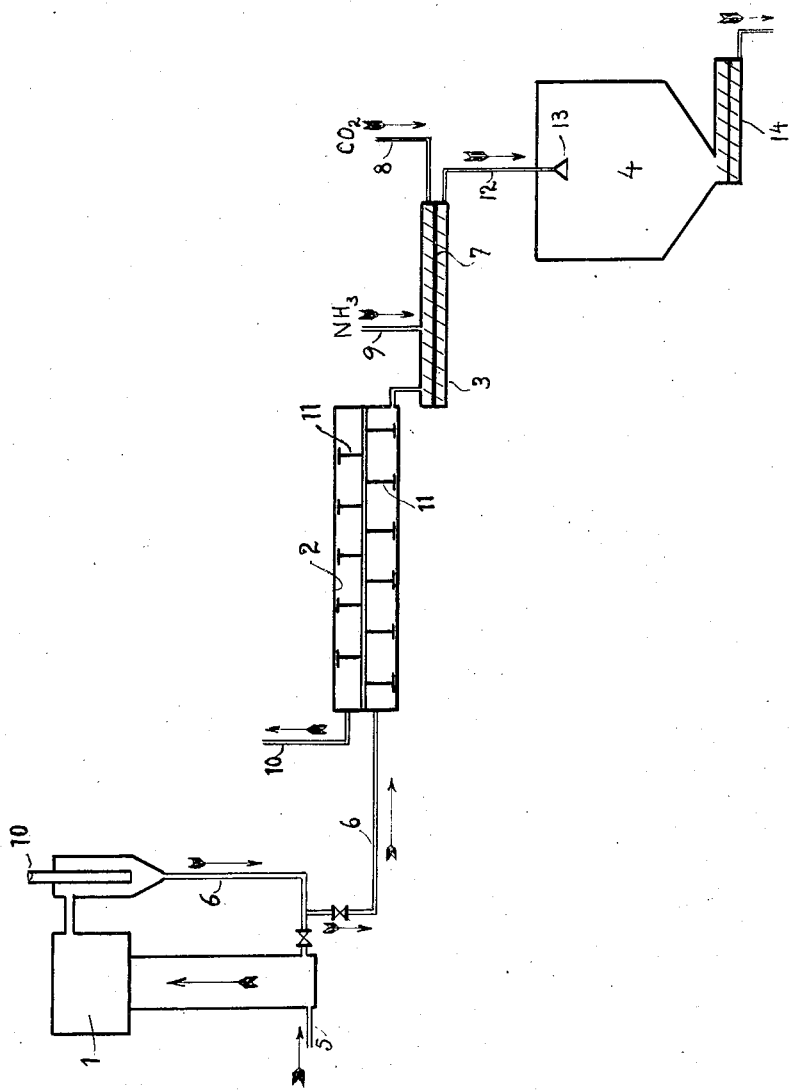

Patented Aug. 22, 1933

1,924,041

UNITED STATES PATENT OFFICE 1,924,041

PROCESS OF MANUFACTURING A PRODUCT CONTAINING AMMONIUM NITRATE AND CALCIUM CARBONATE

Erling Johnson, Odda, Norway, assignor to firm Odda Smelteverk A/S, Odda, Norway Application February 27, 1930, Serial No. 431,973, and in Norway March 4, 1929

2 Claims. (Cl. 71—9)

Ammonium nitrate is at present introduced on the nitrogen market as a mixture with separately prepared finely ground limestone or other material containing calcium carbonate.

The present invention relates to a new process for preparing a product containing ammonium nitrate and calcium carbonate.

It has been proposed to treat a solution of calcium nitrate with carbon dioxide and ammonia in order to convert the calcium nitrate into calcium carbonate and ammonium nitrate according to the reaction:

$$Ca(NO_3)_2 + 2NH_3 + CO_2 + H_2O \rightleftarrows 2NH_4NO_3 + CaCO_3.$$

Since this reaction is reversible, great difficulty has been experienced in producing the solid reaction products from solutions without reversing the reaction.

According to the present invention, a solid product containing intimately admixed ammonium nitrate and calcium carbonate is obtained from a solution in a single operation by continuously subjecting a solution of calcium nitrate to reaction with ammonia and an excess of carbon dioxide and removing water from the reaction product. The calcium nitrate is preferably passed in counter-current contact with the ammonia and excess of carbon dioxide while stirring the same.

The process may be used with nitrate of lime of any origin. It is particularly adapted to be used with that nitrate of lime which is produced, according to my U. S. patent application 391,506, by dissolving phosphate material in nitric acid, but the process may just as well be applied for the nitrate of lime which is produced in the hitherto usual manner by neutralization of nitric acid with limestone or other calcareous material.

The carbonic acid required in the process may be obtained as cheap by-product from several industrial processes as for instance from burning of limestone, from purification of hydrogen nitrogen-mixtures by washing in pressure towers and from waste gases of combustion.

If the process is used with the lime nitrate obtained by neutralization of nitric acid with limestone and the like, the carbonic acid evolved in this operation may be utilized in the process.

The process is then carried out in the manner that in place of grinding limestone and mixing the ground material with ammonium nitrate I dissolve the limestone in lumps in nitric acid and precipitate in the obtained solution the calcium carbonate in finely divided state by treating the solution with the carbonic acid evolved in the neutralization operation and with ammonia. The nitrate solution may be filtered before further treatment in order to purify the solution. Such filtering is however not strictly necessary and may in several cases not even be advantageous, because small quantities of insoluble, finely divided or even colloidal particles may favorably influence certain physical properties in the product.

The product obtained according to the reaction:

$$Ca(NO_3)_2 + 2NH_3 + CO_2 + H_2O \rightleftarrows 2NH_4NO_3 + CaCO_3$$

would in the dry state theoretically contain 21.5 per cent nitrogen, of which one half as nitrate nitrogen and the other half as ammonia nitrogen, and some 40 per cent calcium carbonate in finely divided efficient form.

Practical tests gave directly a product of 20 per cent nitrogen (10.5 per cent nitrate nitrogen and 9.5 per cent ammonia nitrogen).

Referring to the drawing wherein a single figure is shown, diagrammatically, an apparatus is shown in which the process is carried out in the manner that ammonia and carbonic acid, simultaneously, are introduced into a solution of nitrate of lime or into a mass of nitrate of lime melted in its water of crystallization.

The plant as shown consists of a vacuum evaporator 1, a drum 2, a conveyor tube 3 and a tower 4.

The calcium nitrate solution is introduced into the evaporator 1 through the pipe 5 and the concentrated solution passes from the evaporator through the pipe 6 into the drum 2 and from there into the tube 3 by means of conveyor screw 7 for conveying and intimate mixing of the mass. Into the conveyor tube carbonic acid gas is introduced at 8 and ammonia gas at 9. These gases pass from the conveyor tube 3 into the drum 2 in counter-current with the mass under treatment. The drum 2 is provided with stirring devices 11 and scrapers or the like. From the conveyor tube 3 the reaction mass passes through the pipe 12 into the cooled tower 4 in which the liquid mass which is now almost free from water is atomized by passing a nozzle 13 and collects as granules which are removed from the tower 4 by a conveyor 14. The water vapor evolved in the reaction apparatus 2 and 3 and in the evaporator 1 escapes through the pipes 10. The temperature during the reaction may be maintained as high as 100–120° C. To this end the reaction apparatus 2 and 3 may be provided with devices for supplying heat. The plant for carrying out the process may of course vary in detail, and the drawing is only to be considered as an example of an apparatus that may be used but not necessarily must be used.

Simultaneously with the introduction of the gases or the gas mixture, heat may be supplied for evaporation of the water and for bringing the product of reaction to dryness.

The process is preferably carried out continuously and in counter-current under continued stirring and transport of the mass through mixing and reaction apparatus of considerable length, and provided with stirring devices, transport screws and the like, so that an intimate contact is obtained between the gases and the solution. At the same time the water is caused to evaporate by suitable supply of heat so arranged that a finished dry product in the granular state is discharged from the apparatus. The process may also be carried out in a revolving drum or in a plurality of cooperating revolving drums provided with scraping and stirring devices. In order to avoid as far as possible that ammonia escapes without entering into reaction or to prevent a reversing of the reaction it is of advantage to use a surplus of carbonic acid over the equivalent amount of ammonia. Further the supply of gases may be so adjusted that the finished product contains a greater or smaller quantity of unaltered calcium nitrate.

Eventually the process may be performed in two stages in the manner that during the first stage mainly the chemical reaction is carried out while the second stage is principally reserved for conversion of the reaction mixture into finished product by evaporation of water and drying. The two stages may however overlap more or less even when devices are used which are most adapted for each specific stage. In order to avoid a reversing of the reaction during the second stage of the process the supply of the gas mixture or of one of the gas components, preferably carbonic acid, may be continued during this second stage, or said gas mixture or gas component may be present during said stage. The supply of heat is so effected, that the product obtains the temperature which is most convenient for formation of granules already during the course of the process proper before the product is cooled. If a finished product of lower nitrogen content is desired, than that which is formed directly by conversion of the nitrate of lime it is of course possible to admix a suitable quantity of ground limestone to the product. This ground limestone may be added in any stage of the process.

If a less concentrated solution of calcium nitrate is used for the process, the solution may be evaporated to higher concentration for instance to a content of 10–13 per cent nitrogen, preferably before it is treated with ammonia and carbonic acid. Such preliminary concentration of the solution may most conveniently be carried out under a vacuum, in order to remove the water in the most economical way.

If the nitrate of lime is produced by treating phosphate rock and similar phosphate material with nitric acid carbonic acid is evolved, since the phosphate rock always contains more or less calcium carbonate, and this carbonic acid may be utilized in the process eventually together with other carbonic acid.

The heat required for evaporation of water may conveniently be supplied wholly or partly by heating the gases to a suitable high temperature before introducing them into the solution of calcium nitrate.

The second stage of the process, the evaporation of water from the mixture of reaction and the drying for obtaining a solid spreadable product may most conveniently be effected under vacuum. At the low temperature prevailing in this operation the reversion of the chemical reaction is quite insignificant.

I claim:

1. The process of manufacturing in a single operation a solid product containing intimately admixed ammonium nitrate and calcium carbonate, comprising subjecting a solution of calcium nitrate continuously in counter-current with stirring to reaction with ammonia and an excess of carbonic acid and removing water from the reaction product.

2. Process of manufacturing in a single operation a solid product containing intimately admixed ammonium nitrate and calcium carbonate, comprising subjecting a solution of calcium nitrate continuously in counter-current with stirring to reaction with heated gaseous ammonia and carbonic acid and removing water from the reaction product.

ERLING JOHNSON.